Feb. 27, 1968 — G. E. LEWIS — 3,370,477

SHIFTING MECHANISM

Filed Sept. 20, 1965

INVENTOR.
GEORGE E. LEWIS
BY Whittemore,
Hulbert & Belknap
ATTORNEYS

United States Patent Office 3,370,477
Patented Feb. 27, 1968

3,370,477
SHIFTING MECHANISM
George E. Lewis, Oakland Park, Fla., assignor to Power-Flo Products, Inc., Oakland Park, Fla., a corporation of Florida
Filed Sept. 20, 1965, Ser. No. 488,393
6 Claims. (Cl. 74—337.5)

ABSTRACT OF THE DISCLOSURE

Shifting mechanism including an output shaft, a plurality of gears of different size mounted for rotation on the output shaft at fixed axial positions therealong, clutch structures positioned between adjacent ones of the gears mounted on the output shaft for axial movement therealong and against relative rotation with respect thereto for engagement with different ones of said gears in accordance with the axial position of the clutch structures for alternatively connecting different ones of said gears for driving the output shaft in a plurality of speeds in one direction and at least one speed in the opposite direction, means connected to said gears for continuously driving the gears in the one and opposite direction, fork means engaged with the clutch structures for moving them into and out of engagement with the gears, a cam shaft for rotation in opposite directions and cam means operable between the cam shaft and forks for moving the forks to successively engage alternatively different gears separated by neutral positions to provide reverse, first, second and third speeds for the output shaft.

In one modification the fork means includes a pair of forks having sleeve portions with cam surfaces at the relatively remote ends thereof urged in opposite directions by spring means positioned therebetween sleeved over a camming sleeve secured to the cam shaft for rotation therewith including camming pins engaged with the outer ends of the sleeve portions of the forks for moving the forks in accordance with the cam surface on the ends thereof on rotation of the cam shaft.

In another modification the fork means includes a pair of forks having sleeve portions rotatably sleeved on the cam shaft, a pair of cam plate supporting members secured to the cam shaft at the opposite ends of the forks for rotation with the cam shaft, a cam plate secured to the plate supporting members having cam slots therein and cam pins extending through the cam slots and secured to the fork sleeves.

---

In the past shifting mechanism for transmission structures even in the case of simple transmission structures have usually required complex movement of a shifting member such as a rod or shaft which complex movement may include axial movement, rotational movement and movement in a plurality of directions about a pivot point. Such shifting mechanisms require special knowledge of the direction of movement and position required of the shifting rod or shaft for each separate direction and speed ratio provided by the transmission structure. In addition such shifting mechanisms are undesirable in that they have in the past been complicated, uneconomical and often inefficient.

Wherein it has in the past been attempted to provide shifting mechanism in which movement of a shifting member in a single direction has accomplished the shifting between directions and speed ratios provided by a transmission the shifting mechanism has similarly been particularly complicated and thus uneconomical. Further, prior shifting mechanisms of this type have often been inefficient or have lacked the required versatility necessary for use with transmission structure providing a plurality of speeds in one direction and at least one speed in an opposite direction.

It is, therefore, one of the objects of the present invention to provide improved shifting mechanism for use with transmission structures or the like.

Another object is to provide shifting mechanism for shifting between a plurality of transmission speeds in one direction and at least one transmission speed in the opposite direction on rotation of a single shifting shaft.

Another object is to provide shifting mechanism for transmission structure including a plurality of gears driven in one direction and at least one gear driven in the opposite direction including an output shaft, a plurality of gears mounted on the output shaft in mesh with the transmission structure gears, clutch structures mounted on the output shaft for selectively connecting the output shaft to the gears thereon on movement thereof, shifting forks engaged with the clutch structures, a cam shaft carrying the shifting forks and cam means on the cam shaft operable in conjunction with the shifting forks to move the clutch structures axially of the cam shaft to connect the output shaft with a selected one of said plurality of gears.

Another object is to provide shifting mechanism as set forth above wherein the shifting forks have cam surfaces thereon and the cam means includes cam pins in spaced apart relation to each other on the cam shaft with the shifting forks therebetween and resilient means operable between the shifting forks for urging the cam surfaces on the shifting forks into engagement with the cam pins on the cam shaft.

Another object is to provide shifting mechanism as set forth above wherein the cam means includes a cam pin on each of the shifting forks and a cam plate secured to the cam shaft for rotation therewith having separate cam slots therein receiving the separate cam pins.

Another object is to provide shifting mechanism which is simple in construction, economical to manufacture and efficient in use.

These and other objects and features of the invention will become apparent as the description proceeds, especially when taken in conjunction with the accompanying drawing, illustrating a preferred embodiment of the invention, wherein.

Figure 1:
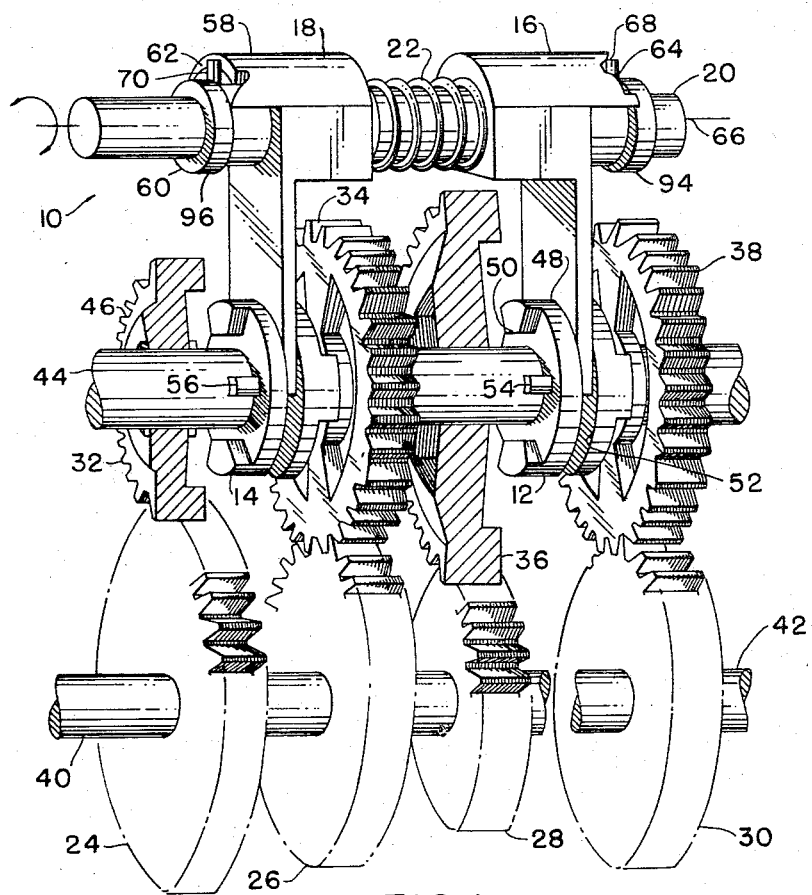
FIGURE 1 is a perspective view of shifting mechanism constructed in accordance with the invention.

With particular reference to the figures of the drawing, one embodiment of the present invention will now be considered in detail.

As shown best in FIGURE 1, the shifting mechanism 10 includes clutch structures 12 and 14, the shifting forks 16 and 18, cam shaft 20 and spring 22. The shifting mechanism 10 is illustrated in conjunction with driven gears 24, 26, 28 and 30 in mesh with gears 32, 34, 36 and 38 respectively on the output shaft 44.

In operation, the shifting forks 16 and 18 are moved to position the clutch mechanisms 12 and 14 so that the gears 38, 36, 34 and 32 are successively connected to the output shaft 44 on the rotation of the shaft 20 in a clockwise direction from a counter-clockwise limiting position.

More specifically, the driven gears 24, 26 and 28 may be connected to a first driven shaft 40 for driving the gears 24, 26 and 28 in a predetermined direction which may be considered a forward direction. The gear 30 is similarly connected to a driven shaft 42 for driving the gear 30 in an opposite direction which may be considered a reverse direction. The drive structure for the shafts 40 and 42 form no part of the present invention and therefore will not be considered in detail herein.

The separate gears 32, 34, 36 and 38 are secured to the output shaft 44 by convenient means such as the collars 46 for rotation with respect to the shaft 44 in a fixed axial position on the shaft 44. The gears 32, 34 and 36 are meshed with the gears 24, 26 and 28 and are rotated by the gears 24, 26 and 28 in a direction to provide three forward speeds in accordance with the gear ratios for the output shaft 44 when connected to the drive shaft 44 for rotation therewith. The gear 38 is meshed with the gear 30 whereby the gear 38 provides rotation of the output shaft 44 in a reverse direction when connected to the output shaft 44 for rotation therewith.

The clutch structures 12 and 14 are the same. Therefore, only clutch structure 12 will be considered in detail. The clutch structure 12 is a hollow cylindrical member 48 having dogs 50 on the opposite side thereof for engagement with similar dogs on the adjacent sides of the gears 36 and 38 on axial movement of the hollow cylindrical member 48 in opposite directions along the output shaft 44. The hollow cylindrical member 48 includes the annular groove 52 axial centrally thereof. The clutch structure 12 is connected to the output shaft 44 for axial movement with respect thereto and is fixed rotationally with respect thereto by spline means 54 operable therebetween.

In operation on axial movement of the clutch structure 12 on output shaft 44 in opposite directions, the clutch structure 12 will connect the output shaft 44 to the gear 36 on movement to the left in FIGURE 1 and will connect the output shaft 44 to the gear 38 on movement to the right in FIGURE 1. Similarly, the clutch structure 14 on movement to the left in FIGURE 1 will connect the gear 32 to the output shaft 44 due to engagement of dogs on the gear 32 with the dogs 50 on the clutch structure 14. On movement to the right in FIGURE 1, the clutch structure 14 connects the gear 34 with the output shaft 44.

The clutch structures 12 and 14 are moved axially of the drive shaft 44 by the shifting forks 16 and 18 respectively. The shifting forks 16 and 18 are similar. Therefore, only the shifting fork 18 will be considered in detail.

The shifting fork 18 is provided with a semi-circular notch in the end 56 thereof fitting within the annular recess 52 of the clutch structure 14. A hollow cylindrical portion 58 is provided on the upper end of the shifting fork 18 which cylindrical portion is sleeved over the cam sleeve 60 for axial movement with respect to the cam shaft 20 on rotation of shaft 20. A cam surface 62 is provided on one end of the cylindrical portion 58 of the shifting fork having a cam contour similar to that illustrated in FIGURE 3 at the left. The shifting fork 16 differs from the shifting fork 18 in that the cam surface 64 thereof is similar to the cam surface illustrated in FIGURE 3 at the right.

The shifting forks 16 and 18 as indicated above are sleeved over the cam sleeve 60 for axial movement with respect thereto. The cam sleeve 60 is secured to the cam shaft 20 for rotation therewith about the longitudinal axis 66 of the cam shaft 20. The cam pins 68 and 70 extend perpendicularly from the cam sleeve 60 for rotation with the cam shaft 20. Spring 22 urges the shifting forks 16 and 18 away from each other so that the cam surface 62 engages the cam pin 70 and the cam surface 64 engages the cam pin 68.

In overall operation of the shifting mechanism 10 with the shaft 20 in a full counter-clockwise direction, the pin 70 engages the cam surface 62 to maintain the fork 18 in a neutral position while the pin 68 engages the cam surface 64 to permit movement of the clutch structure 12 to connect the gear 38 with the output shaft 44 whereby reverse rotation is imparted to the output shaft 44. The relative position of the cam surfaces 62 and 64 and pins 70 and 68 are illustrated in FIGURE 3 at the line indicated R at the right for reverse rotation of the shaft 44.

Figure 3:
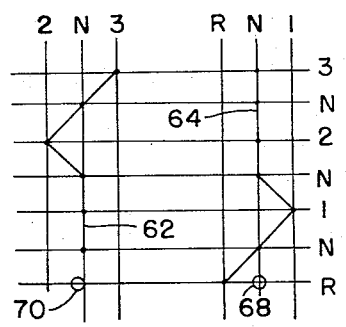
FIGURE 3 is a diagrammatic representation of a cam configuration for use in the shifting mechanisms illustrated in FIGURES 1 and 2.

As the cam shaft 20 is rotated clockwise into the position indicated by the line N at the right in FIGURE 3, the cam surfaces 64 and 62 are such that the shifting fork 18 will remain in the neutral position as illustrated in FIGURE 3 and the fork 16 will be returned to the neutral position as illustrated on the line N at the right in FIGURE 3. Thus, in the neutral position both of the clutch structures 12 and 14 are out of engagement with the gears 32, 34, 36 and 38.

On continued rotation of the shaft 20 in a clockwise direction clutch structure 12 moves to the left from the neutral position to connect the first gear 36 with the output shaft 44 whereby a first or low forward speed is imparted to the shaft 44. The clutch structure 14 is still maintained in a neutral position as illustrated in FIGURE 3. Continued rotation of the shaft 20 in the clockwise direction brings the clutch structure 12 back to the neutral position again as shown in FIGURE 1.

As the cam shaft 20 is rotated still further in a clockwise direction the shifting fork 16 and clutch structure 12 are maintained in a neutral position due to the inner action between the cam pin 68 and cam surface 64. However, the shifting fork 18 is moved to the right whereby the clutch structure 14 connects the second gear 34 with the output shaft 44 to produce rotation thereof at a second forward speed.

Similarly, continued rotation of the cam shaft 20 clockwise will return the shifting fork 18 and clutch structure 14 to the neutral position while maintaining the shifting fork 16 and clutch structure 12 in the neutral position and will subsequently move the shifting fork 18 into a position whereby the gear 32 is connected by clutch structure 14 to drive shaft 44 to provide a third forward speed of rotation thereof while the shifting fork 16 is maintained in a neutral position.

With the shifting mechanism shown it will thus be evident that the shifting mechanism may be returned to neutral from any speed ratio. However, none of the speed ratio gears may be skipped in returning the cam shaft 20 to the ultimate neutral position between the reverse and first forward gear ratio position. Thus, the skipping of gear ratios which is detrimental to the transmission and shifting mechanism is prevented while a complete gear ratio range for forward speeds and a reverse speed is provided in accordance with the shifting mechanism 10 which is simple, economical and efficient.

Figure 2:
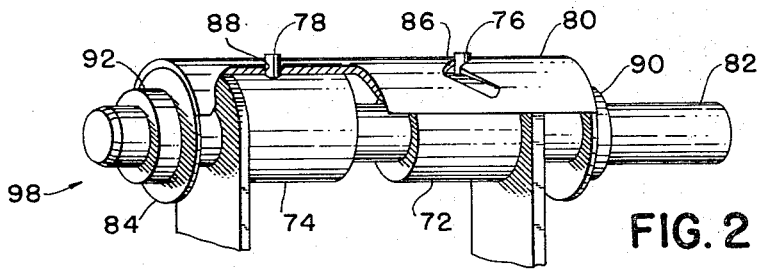
FIGURE 2 is a perspective view of modified cam structure for the shifting mechanism illustrated in FIGURE 1.

The modified shifting mechanism 98 illustrated in FIGURE 2 is similar to the shifting mechanism illustrated in FIGURE 1 except that the shifting forks 72 and 74 are provided with cam follower pins 76 and 78 secured thereto and a cam plate 80 is mounted on the cam shaft 82 for rotation therewith by means of the annular discs 84 at each end thereof. The cam pins 76 and 78 are positioned in cam slots 86 and 88 in the cam plate 80 which are formed in the manner of the cam surfaces 62 and 64 to provide movement of the shifting forks 72 and 74 similar to the movement of the shifting forks 16 and 18. Again the cam shaft 20 is mounted in a fixed axial position in the bearings 90 and 92 similar to the bearings 94 and 96 rotatably mounting the cam shaft 20 in a fixed position axially.

The operation of the modified shifting mechanism 98 illustrated in FIGURE 2 is exactly the same as the shifting mechanism 10. While one embodiment of the present invention and one modification thereof have been considered in detail, it will be understood that other embodiments and modifications of the invention are contemplated. It is the intention to include all embodiments and modifications as are defined by the appended claims within the scope of the invention.

What I claim as my invention is:

1. In combination an output shaft, at least a first, second, third and reverse gear rotatably mounted on the output shaft, means for rotating the first, second and third gears in one direction and means for rotating the reverse gear in the opposite direction for providing a plurality of rotational speeds of the output shaft in one direction and at least one speed of the output shaft in the reverse direction on connection of the gears thereto for rotation, separate clutch structure mounted on the output shaft for rotation therewith and movement axially thereof between the reverse and first and between the second and third gears respectively, including an annular recess centrally thereof, a cam shaft, a camming sleeve mounted on the cam shaft for rotation therewith, a cam pin extending transversely outwardly from the camming sleeve at the ends thereof, a pair of shifting forks having sleeve portions sleeved over the camming sleeve between the pins, cam ends on the sleeve portions of the shifting forks in engagement with the cam pins on the cam sleeve, resilient means operable between the adjacent ends of the sleeve portions of the shifting forks urging the shifting forks in opposite directions and fork ends on the shifting forks received within the annular recess of a respective clutch structure for movement of the clutch structures axially of the cam shaft and output shaft on rotation of the cam shaft to engage the clutch structures with the gears alternatively on rotation of the cam shaft in a single direction.

2. Structure as set forth in claim 1, wherein the cam surfaces on the shifting forks are designed and constructed to move the shifting forks to successively engage the reverse, first, second and third gears with a neutral position in which no gear is engaged between engagement of each of the gears on rotation of the cam shaft in a single direction.

3. In combination an output shaft, at least a first, second, third and reverse gear rotatably mounted on the output shaft, means for rotating the first, second and third gears in one direction and means for rotating the reverse gear in the opposite direction for providing a plurality of rotational speeds of the output shaft in one direction and at least one speed of the output shaft in the reverse direction on connection of the gears thereto for rotation with the output shaft, separate clutch structure mounted on the output shaft for rotation therewith and movement axially thereof between the reverse and first and between the second and third gears respectively, including an annular recess centrally thereof, a cam shaft, a pair of shifting forks mounted on the cam shaft for movement axially thereof, each including a sleeve portion sleeved over the cam shaft and cam pins extending out of the sleeve portion of the shifting forks, a forked end on each of the shifting forks received within the annular recess of a respective clutch structure, a cam plate secured to said cam shaft over the sleeve portions of the shifting forks for rotation with the cam shaft having cam slots therein receiving the cam pins on the shifting forks, whereby on rotation of the cam shaft the shifting forks are moved axially of the cam shaft and output shaft to engage the clutch structures with predetermined ones of the gears alternatively.

4. Structure as set forth in claim 3, wherein the cam slots are designed and constructed to move the shifting forks to successively engage the reverse, first, second and third gears with a neutral position in which no gear is engaged between engagement of each of the gears on rotation of the cam shaft in a single direction.

5. Shifting mechanism comprising a cam shaft, a cam sleeve secured to said cam shaft for rotation therewith, cam pins extending transversely out of the cam sleeve at the opposite ends thereof, shifting forks having sleeve portions at one end thereof mounted for axial movement on the cam sleeve between the pins, said sleeve portions having cam ends thereon engaged with the cam pins and resilient means operable between the adjacent ends of the sleeve portions of the shifting forks for urging the shifting forks in opposite directions, whereby the cam surface on the cam ends of the sleeve portions of the shifting forks are maintained in engagement with the cam pins on the cam sleeve on rotation of the cam shaft.

6. Shifting mechanism comprising a cam shaft, a pair of shifting forks having sleeve portions at one end thereof mounted on the cam shaft for axial movement therealong, cam pins extending transversely of the sleeve portion of the shifting forks, annular discs secured to the cam shaft at opposite ends thereof including the sleeve portions of the shifting forks therebetween, a cam plate secured to and extending between the annular discs for rotation with the cam shaft and cam slots in the cam plate for receiving the cam pins secured to the sleeve portions of the shifting forks whereby the shifting forks are moved axially of the camming shaft on rotation of the camming shaft.

References Cited
UNITED STATES PATENTS

| | | | |
|---|---|---|---|
| 901,456 | 10/1908 | Loitron | 74—337.5 |
| 1,221,925 | 4/1917 | Trott | 74—337.5 |

FOREIGN PATENTS

| | | |
|---|---|---|
| 766,724 | 7/1934 | France. |
| 18,872 | 10/1900 | Great Britain. |

DONLEY J. STOCKING, *Primary Examiner.*

H. S. LAYTON, *Assistant Examiner.*